(12) United States Patent
Hesterman et al.

(10) Patent No.: US 10,164,520 B2
(45) Date of Patent: Dec. 25, 2018

(54) SHORT CIRCUIT PROTECTION FOR SWITCHING POWER CONVERTERS

(71) Applicant: Aerojet Rocketdyne, Inc., Sacramento, CA (US)

(72) Inventors: Bryce Hesterman, Redmond, WA (US); Alexandr L. Kristalinski, Kirkland, WA (US)

(73) Assignee: Aerojet Rocketdyne, Sacramento, CA (US)

( * ) Notice: Subject to any disclaimer, the term of this patent is extended or adjusted under 35 U.S.C. 154(b) by 0 days.

(21) Appl. No.: 15/747,387

(22) PCT Filed: Aug. 2, 2016

(86) PCT No.: PCT/US2016/045159
§ 371 (c)(1),
(2) Date: Jan. 24, 2018

(87) PCT Pub. No.: WO2017/039917
PCT Pub. Date: Mar. 9, 2017

(65) Prior Publication Data
US 2018/0219472 A1 Aug. 2, 2018

Related U.S. Application Data

(60) Provisional application No. 62/213,726, filed on Sep. 3, 2015.

(51) Int. Cl.
*H02M 1/36* (2007.01)
*H02H 7/122* (2006.01)
(Continued)

(52) U.S. Cl.
CPC ............ *H02M 1/36* (2013.01); *H02H 1/0007* (2013.01); *H02H 7/1227* (2013.01); *H02M 1/12* (2013.01);
(Continued)

(58) Field of Classification Search
CPC ............ H02M 3/335; H02M 3/33507; H02M 3/33515; H02M 3/33523; H02M 3/33538;
(Continued)

(56) References Cited

U.S. PATENT DOCUMENTS 6,385,060 B1   5/2002  Basso et al.
7,295,452 B1   11/2007 Liu
(Continued)

OTHER PUBLICATIONS

International Search Report and Written Opinion for PCT/US2016/045159 dated Oct. 13, 2016.

*Primary Examiner* — Gustavo Rosario Benitez
(74) *Attorney, Agent, or Firm* — Fox Rothschild LLP; Carol E. Thorstad-Rothschild

(57) ABSTRACT

A circuit (100) for protecting a Switching Power Converter ("SPC") when a short-circuit load condition occurs. The SPC has an output current sensor utilizing at least one current transformer that has a primary winding connected in series with a rectifier and has a magnetic core that should avoid saturation. A pulse-width modulator includes a skip controller providing a series of control pulses to at least one switch. A control pulse is skipped when an abnormally low load resistance causes an input current ramp signal to exceed an input current setpoint signal proximate a start time of a next control pulse of the series and the output current is greater than a predetermined threshold. Operation of the SPC is stopped if more than a predetermined number of consecutive switching cycles are skipped to prevent operation of the SPC while the core of an output current transformer is saturated.

19 Claims, 11 Drawing Sheets

(51) Int. Cl.
*H02H 1/00* (2006.01)
*H02M 3/335* (2006.01)
*H02M 1/00* (2006.01)
*H02M 1/12* (2006.01)
*H02M 1/32* (2007.01)
*H02M 3/338* (2006.01)

(52) U.S. Cl.
CPC ... *H02M 3/33507* (2013.01); *H02M 3/33569* (2013.01); *H02M 1/32* (2013.01); *H02M 3/3384* (2013.01); *H02M 2001/0009* (2013.01); *H02M 2001/0032* (2013.01)

(58) Field of Classification Search
CPC ..... H02M 3/33546; H02M 2001/0003; H02M 2001/0009; H02M 2001/0025; H02M 2001/0032; H02M 2001/0035; H02M 1/32; H02M 1/36; H02M 1/08; Y02B 70/16; Y02B 70/1433; Y02B 70/1475
See application file for complete search history.

(56) References Cited

U.S. PATENT DOCUMENTS

| | | | |
|---|---|---|---|
| 7,969,125 B2 | 6/2011 | Melanson | |
| 2005/0259448 A1 | 11/2005 | Koike | |
| 2007/0008748 A1 | 1/2007 | Tang | |
| 2007/0090821 A1* | 4/2007 | Imai | H02M 1/32 323/284 |
| 2013/0077350 A1* | 3/2013 | Mao | H02M 3/33523 363/16 |
| 2013/0154598 A1* | 6/2013 | Yu | G05F 1/618 323/285 |
| 2014/0078790 A1* | 3/2014 | Lin | H02M 3/33507 363/21.16 |
| 2014/0112035 A1 | 4/2014 | Shu et al. | |
| 2014/0133194 A1 | 5/2014 | Djenguerian et al. | |
| 2015/0098255 A1* | 4/2015 | Nate | H02M 1/36 363/21.16 |
| 2015/0357927 A1* | 12/2015 | Zhang | H02M 3/33569 363/21.02 |

* cited by examiner

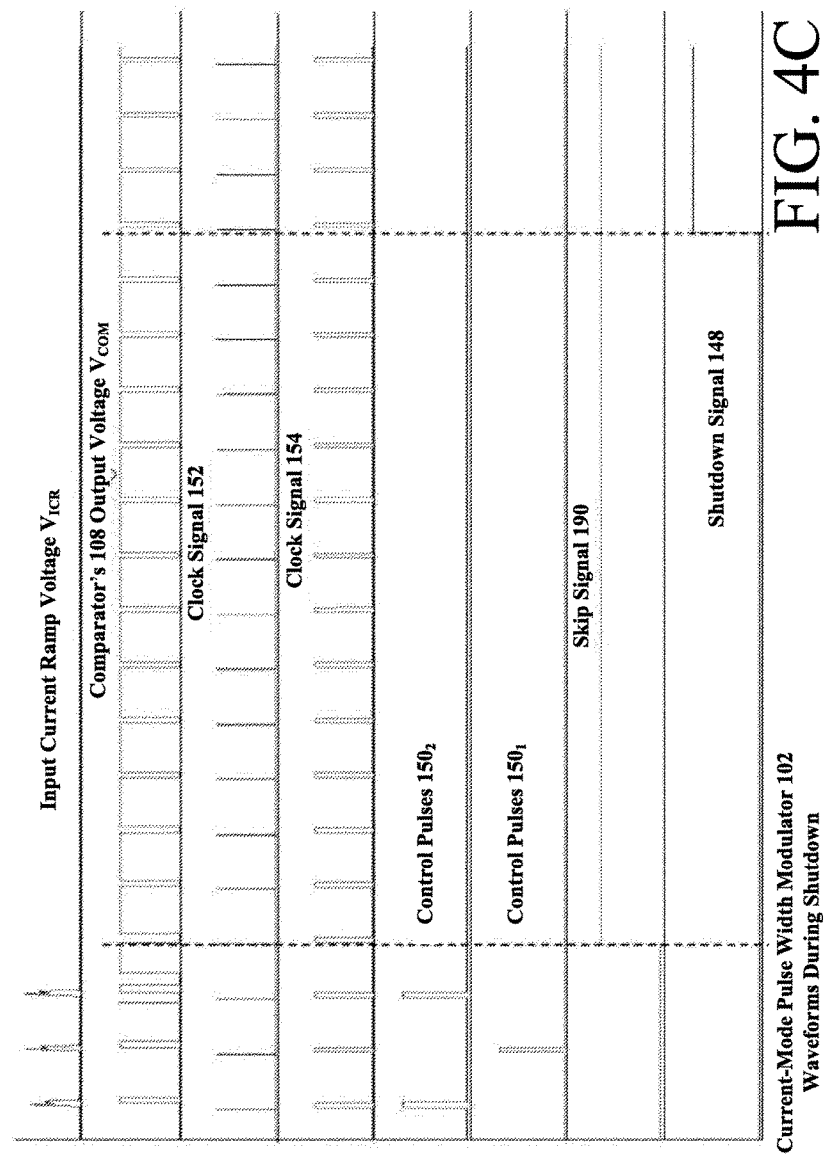

SHORT CIRCUIT PROTECTION FOR SWITCHING POWER CONVERTERS

CROSS-REFERENCE TO RELATED APPLICATIONS

This application claims the benefit of U.S. Patent Application Ser. No. 62/213,726 filed Sep. 3, 2015, which is incorporated by reference.

BACKGROUND

Statement of the Technical Field

The disclosure relates to electronic systems. More particularly, the disclosure concerns systems and methods for providing short circuit protection for Switching Power Converters ("SPCs").

Description of the Related Art

There are many SPCs known in the art. SPCs are generally configured to increase or decrease an output voltage or current by adjusting the duty cycle of at least one switch (e.g., a Field Effect Transistor ("FET")) that is periodically turned on and off with control pulses. A load is connected across the output voltage terminals of the SPC. During operation, the load may develop an abnormally low resistance or a short-circuit may be formed across the output voltage terminals that could cause damage to the SPC unless switching is appropriately controlled to prevent excessive output currents.

SUMMARY

The present disclosure concerns a system for providing short-circuit protection for certain SPCs. In some scenarios, the SPC includes a switch (e.g., a transistor), an output inductor, an output rectifier (e.g., a diode or synchronous switch) and at least one current transformer. The current transformer includes a magnetic core and a primary winding connected in series with the output rectifier. The relevant SPCs indirectly measure the output current with the current transformer. The protection circuit follows a control algorithm that enables safe operation in the event that output terminals of the SPC are loaded with an abnormally low resistance.

The system comprises an input current sensor, an output current sensor, a feedback controller and a current-mode pulse-width modulator. The input current sensor is electrically connected to detect an input current of the SPC. The input current sensor is configured to generate an input current ramp signal $S_{ICR}$ representing the detected input current. The output current sensor is electrically connected to detect an output current of the SPC by sensing pulsing currents flowing through at least one rectifier using the current transformer. The output current sensor is configured to generate an output current signal $S_{OC}$ representing the detected output current. The feedback controller is electrically connected to the output current sensor. The feedback controller is configured to generate a current setpoint signal $S_{CSP}$ having a voltage which, in some scenarios, is based on a time integral of a voltage of an error signal derived from a detected difference between the output current signal $S_{OC}$ and a reference signal. The feedback controller may be implemented using analog or digital circuitry.

The current-mode pulse-width modulator is electrically connected to the feedback controller. The current-mode pulse-width modulator is configured to generate a series of control pulses to be supplied to the SPC for selectively transitioning at least one switch (e.g., a field effect transistor) of the SPC between an on state and an off state. During normal operation, an input current ramp signal $S_{ICR}$ is less than the current setpoint signal $S_{CSP}$ at the beginning of each switching cycle. The control pulses begin at a predetermined start time of a switching cycle and end when either the input current ramp signal $S_{ICR}$ exceeds the current setpoint signal $S_{CSP}$ or the control pulse duration reaches a predetermined maximum value.

The current-mode pulse-width modulator is also configured to skip generation of at least one control pulse of the series of control pulses when a first voltage level of the input current ramp signal $S_{ICR}$ exceeds a second voltage level of the current setpoint signal $S_{CSP}$ proximate a start time of the next control pulse of the series of control pulses. The first voltage level exceeds the second voltage level when an abnormally low load resistance is connected between output terminals of the power converter during operation of the SPC. The current-mode pulse-width modulator is further configured to stop operations of the SPC if more than a predetermined number of consecutive cycles are skipped so as to prevent operation of the SPC while the core of an at least one current transformer is saturated.

In order to prevent unnecessary pulse skipping in some scenarios, pulse skipping is allowed only when the output current signal $S_{OC}$ exceeds a predetermined threshold. Stated differently, pulse skipping is blocked when the output current of the SPC is less than a predetermined threshold.

In some scenarios, the input current sensor comprises a first sensor coupled to a secondary winding of at least one first current transformer electrically connected in series with the switch of the SPC. The output current sensor comprises a second sensor electrically connected to a secondary winding of at least one second current transformer having a primary winding electrically connected to an output rectifier. The second sensor comprises: a diode connected in series with the secondary winding of the second current transformer to prevent current from flowing in a reverse direction from an output of the output current sensor towards the second current transformer; a diode allowing a polarity of a voltage across the second current transformer to reverse following an end of a conduction period of rectifier diodes of the SPC; and/or a voltage limiter (e.g., a Zener diode or resistor) for limiting the reverse-polarity voltage level.

In those or other scenarios, the feedback controller comprises an error amplifier connected in series with an integrator. The error amplifier and integrator may be combined into one analog or digital circuit. The current-mode pulse-width modulator comprises a comparator to determine when the first voltage level of the input current ramp signal $S_{ICR}$ exceeds the second voltage level of the current setpoint signal $S_{CSP}$. A signal for inhibiting control pulse skipping is generated when an output current of the SPC is less than a minimum output current threshold.

In those or other scenarios, the current-mode pulse-width modulator comprises a skip controller programmed to cause: generation of a control pulse of the series of control pulses when a clock signal and an output signal of a comparator are not asserted; generation of a control pulse of the series of control pulses when at least one of a clock signal and an output signal of a comparator is asserted and an output current of the SPC has not risen above a minimum output current threshold; and/or a skip of a control pulse generation when at least one of a clock signal and an output signal of a comparator is asserted and an output current of the SPC has risen above a minimum output current threshold. The clock signal is asserted when the output current of the SPC rises above a minimum output current threshold. The comparator is asserted based on results of a comparison of an input current ramp voltage waveform and a current setpoint voltage waveform. The SPC is shut down when a skip limit has been reached and a flux in an output current transformer's magnetic core is moving towards saturation.

BRIEF DESCRIPTION OF THE DRAWINGS

The present solution will be described with reference to the following drawing figures, in which like numerals represent like items throughout the figures.

FIG. 4C provides a graph showing exemplary waveforms for the current-mode pulse width modulator of FIG. 1 during shutdown.

DETAILED DESCRIPTION

The present disclosure is directed to implementing systems and methods for providing short-circuit protection for an SPC, such as forward power converters. The methods implement a control algorithm that enables safe operations of the SPC in the event that output terminals 180, 182 of the SPC are shorted together with a low resistance connection across a load. This control algorithm involves measuring an input current and an output current of the SPC.

In some SPCs, such as the forward power converter, it is advantageous to measure the output current indirectly by sensing pulsing current in an output rectifier using current transformers instead of using a current shunt to directly measure the Direct Current ("DC") output current because the current transformers provide electrical isolation between the output of the SPC and control circuitry and a high degree of immunity to electrical noise. Current shunts do not provide electrical isolation and the small output signals they produce are prone to being corrupted with electrical noise. In some SPCs, the duty cycle of the control pulses cannot be made sufficiently small to prevent excessive output currents when the load resistance is abnormally low, so some pulses may be skipped in order to prevent the output current from becoming excessive. Repeated consecutive pulse skipping may cause some output current sensors that use current transformers to malfunction due to saturation of current transformer magnetic cores thereby preventing some SPCs that use pulse skipping from providing adequate protection from short circuit load conditions. The present solution addresses this problem.

Figure 1:
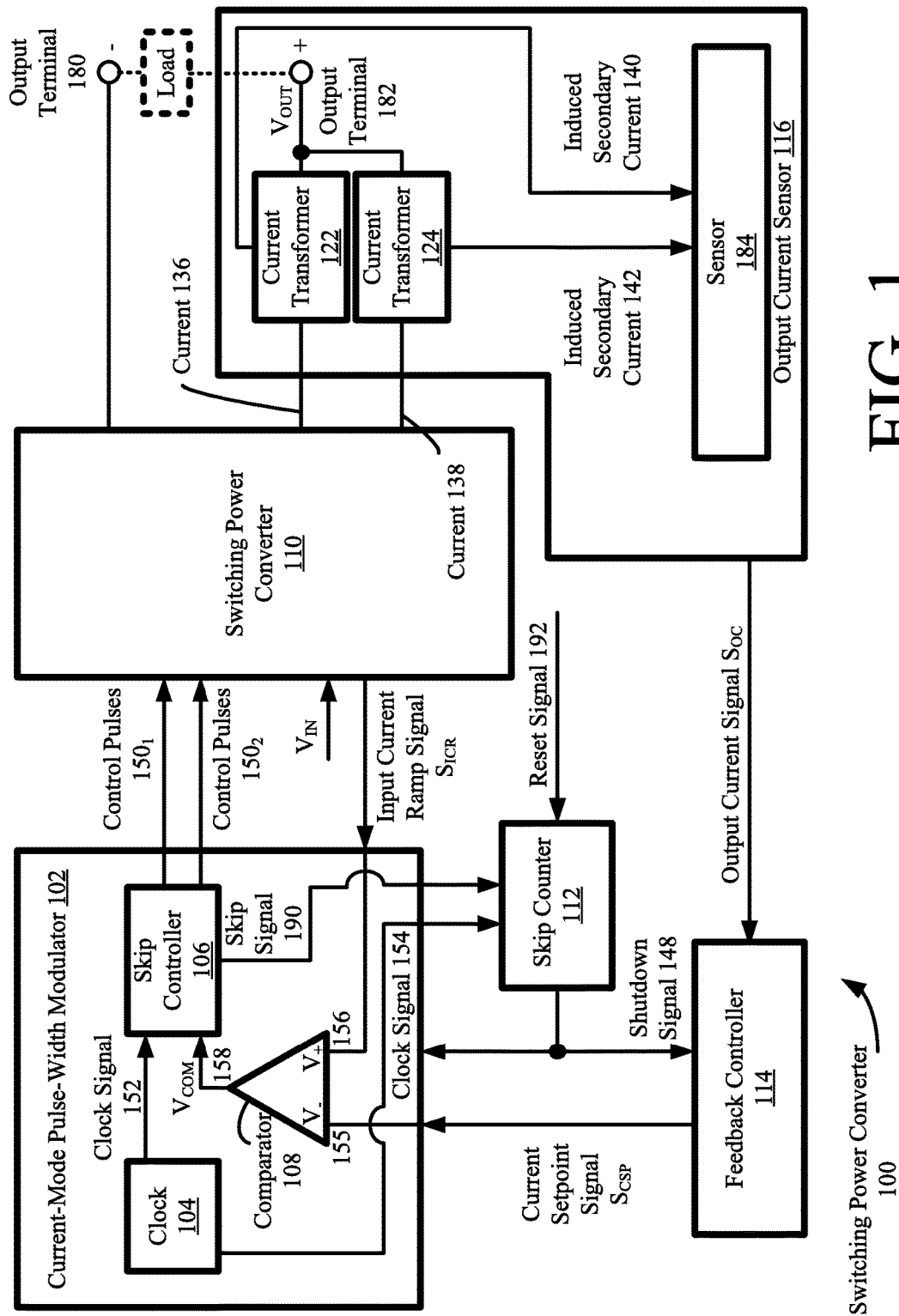
FIG. 1 is a schematic illustration of an exemplary electronic protection circuit.

Referring now to FIG. 1, there is provided a schematic illustration of an exemplary SPC 100 with a protection circuit for an SPC 110. The SPC 110 can include any known or to be known power converter in which the output current can be indirectly measured through current transformers connected in series with rectifier diodes. For example, in some scenarios, the SPC 110 is a forward power converter. The forward power converter provides input-output ground isolation as well as a step-down or step-up function. In this case, the SPC 110 receives an input voltage Vin from a voltage source (not shown) and outputs an increased/decreased output voltage $V_{OUT}$ which is supplied to the load. Graphs showing an exemplary output voltage $V_{OUT}$ of the SPC 110 are provided in FIGS. 3A, 3B and 3C.

Figure 2:
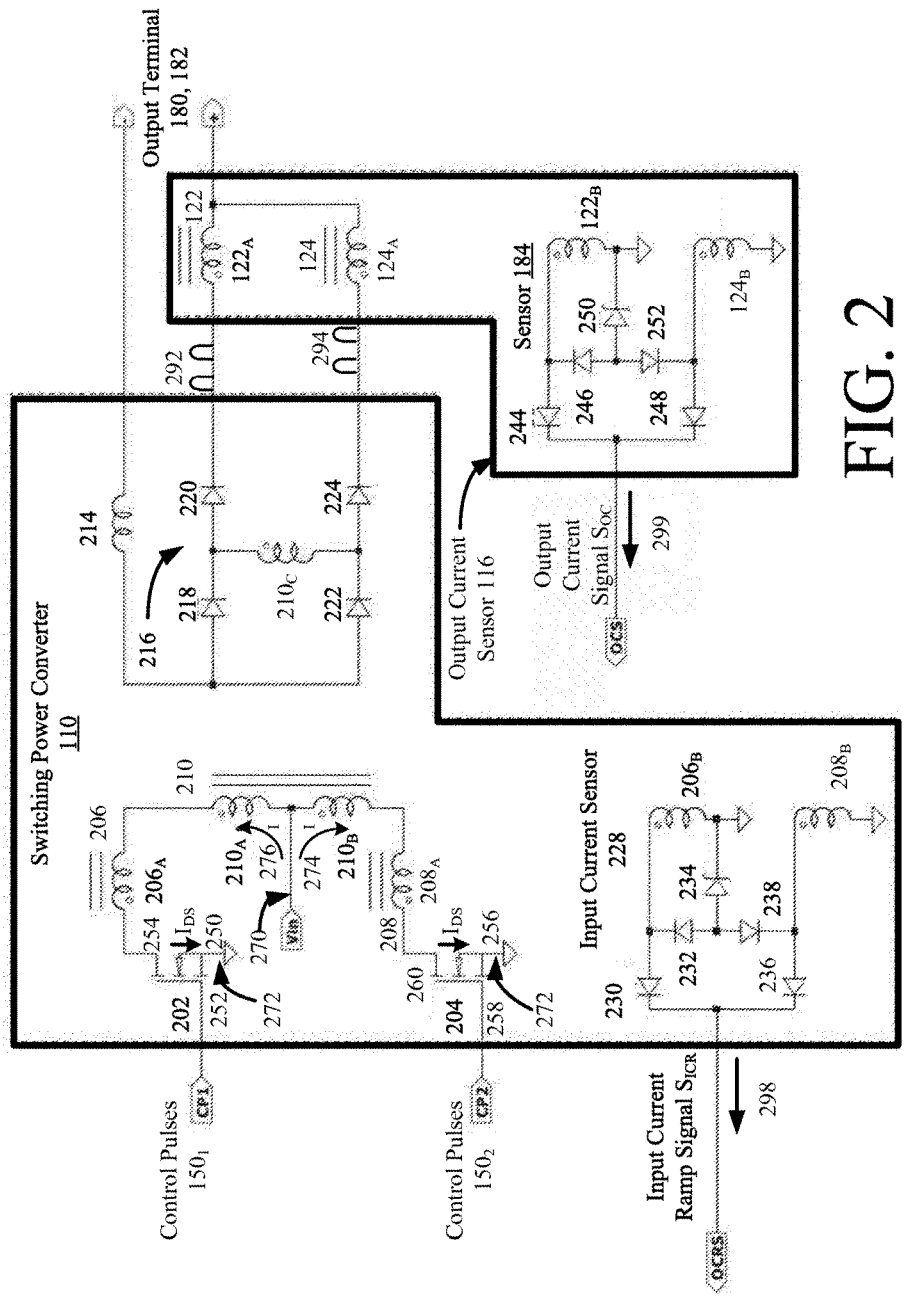
FIG. 2 is a schematic illustration of exemplary architectures for the power converter and output current sensor shown in FIG. 1.

A schematic illustration of an exemplary architecture for the SPC 110 is provided in FIG. 2. As shown in FIG. 2, the SPC 110 comprises switches 202, 204, current transformers 206, 208, a transformer 210, an inductor 214, a diode rectifier 216 (formed of diodes 218-224) and an input current sensor 228 (formed of diodes 230-238). Each of these listed electronic components 202-242 is well known in the art, and therefore will not be described herein. Still, it should be understood that in some scenarios (such as that shown in FIG. 1) the switches 202, 204 comprise enhancement mode Metal Oxide Semiconductor FETs ("MOSFETs") of an N-channel type and the diode rectifier 216 comprises a full wave bridge rectifier. The present solution is not limited in this regard.

Each MOSFET has three (3) terminals respectively defined as a source, gate and drain. With regard to the first MOSFET 202, the source, gate and drain terminals are respectively identified with reference numbers 250, 252, 254. The source, gate and drain terminals of the second MOSFET 204 are respectively identified with reference numbers 256, 258, 260. An electrical path is provided from the source to the drain of each MOSFET 202, 204. This path is generally referred to herein as the source-drain path.

As shown in FIG. 2, the gate of each MOSFET 202, 204 is connected so as to receive control pulses $150_1$ or $150_2$ from an external device (e.g., current-mode pulse-width modulator 102 of FIG. 1). Graphs showing exemplary control pulses $150_1$, $150_2$ are provided in FIGS. 3A-3C. The control pulses $150_1$, $150_2$ cause the MOSFETs 202, 204 to transition between their "on" states and "off" states. When a MOSFET 202 or 204 is in its "on" state, current $I_{DS}$ flows from its drain 254, 260 to its source 250, 256.

The source-drain path of MOSFET 202 is connected in series with a primary winding $206_A$ of current transformer 206 and a primary winding $210_A$ of transformer 210. These electronic components 202, $206_A$, $210_A$ are connected across input lines 270, 272. Similarly, the source-drain path of MOSFET 204 is connected in series with a primary winding $208_A$ of current transformer 208 and a primary winding $210_B$ of transformer 210. These electronic components 204, 208, $210_B$ are connected across input lines 270, 272. Input line 270 is electrically coupled to a voltage source (not shown) from which $V_{IN}$ is supplied. Input line 272 is electrically coupled to ground.

During operation, the MOSFETs 202, 204 are selectively turned "on" and "off" via control pulses $150_1$, $150_2$ so that a pulsed currents 274 and 276 flow in transformer 210. The pulsed currents 274 and 276 cause an induced secondary current to be produced by a secondary winding $210_C$ of transformer 210. The induced secondary current flows through diode rectifier 216. Diode rectifier 216 generates rectified pulses 292, 294. Rectified pulses 292, 294 flow through output current sensor 116 which monitors the same to produce an output signal $S_{OC}$ that represents the output current flowing through output terminals 180, 182 to a load (not shown).

Notably, inductor 214 is a filter output filter inductor. The output of the rectifier diodes is a pulsing voltage. The inductor 214 smooths the current supplied to the load. Graphs showing exemplary inductor currents are provided in FIGS. 3A-3C.

The input current of the SPC $110_A$ and $110_B$ are also monitored for purposes of controlling the duration of control pulses $150_1$, $150_2$ and for detecting a low resistance or short circuit condition. In this regard, the SPC 110 also comprises an input current sensor 228. Input current sensor 228 comprises diodes 230-238 and is able to detect the input current of the SPC 110 and generate induced secondary currents via secondary windings $206_B$, $208_B$ of the transformers 206, 208. The induced secondary currents flow to diodes 230, 236. The output of diodes 230, 236 is referred to as an input current ramp signal $S_{ICR}$. Graphs showing an exemplary input current ramp signal $S_{ICR}$ are provided in FIGS. 3A-3C.

Diodes 230, 236 ensure that current only flows in direction 298 and not in the opposite direction. Diodes 232, 238 allow the polarity of the voltage across the current transformers 206, 208 to reverse following the end of the switching period. The magnetizing currents of the current transformers 206, 208 flow through diodes 232, 238 into Zener diode 234 until they are dissipated. This resets the flux in the cores of the current transformers 206, 208. Zener diode 234 limits how far negative the voltage will go. Typically the breakdown voltage for Zener diode 234 (e.g., a 68 Volt diode) would be in the range of ten (10) to one hundred (100) Volts. Increasing the breakdown voltage decreases the time required to reset the core of current transformers 206, 208.

Figure 3A:
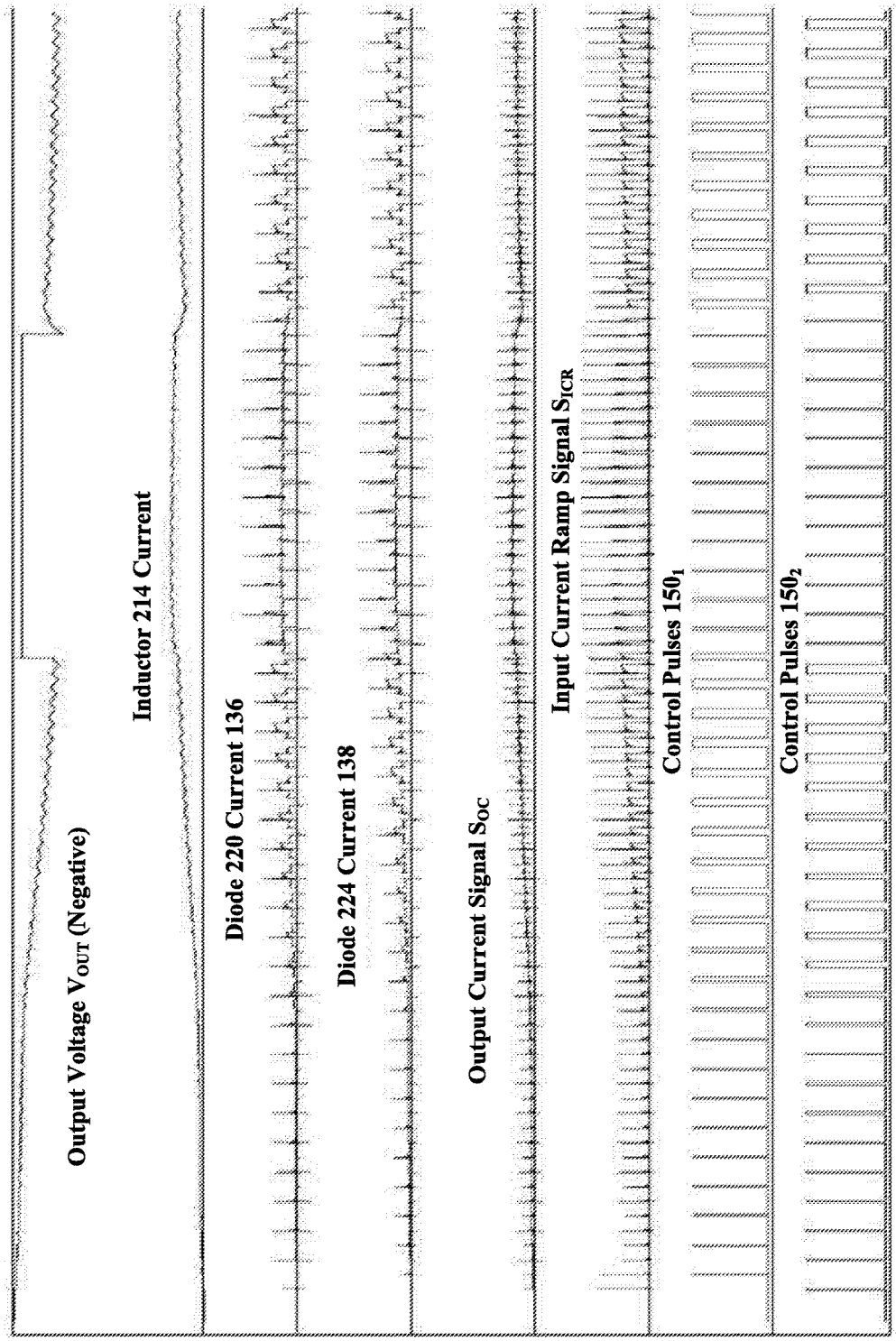
FIG. 3A provides a graph showing exemplary waveforms for the power converter of FIGS. 1-2 during normal operation.
Figure 3B:
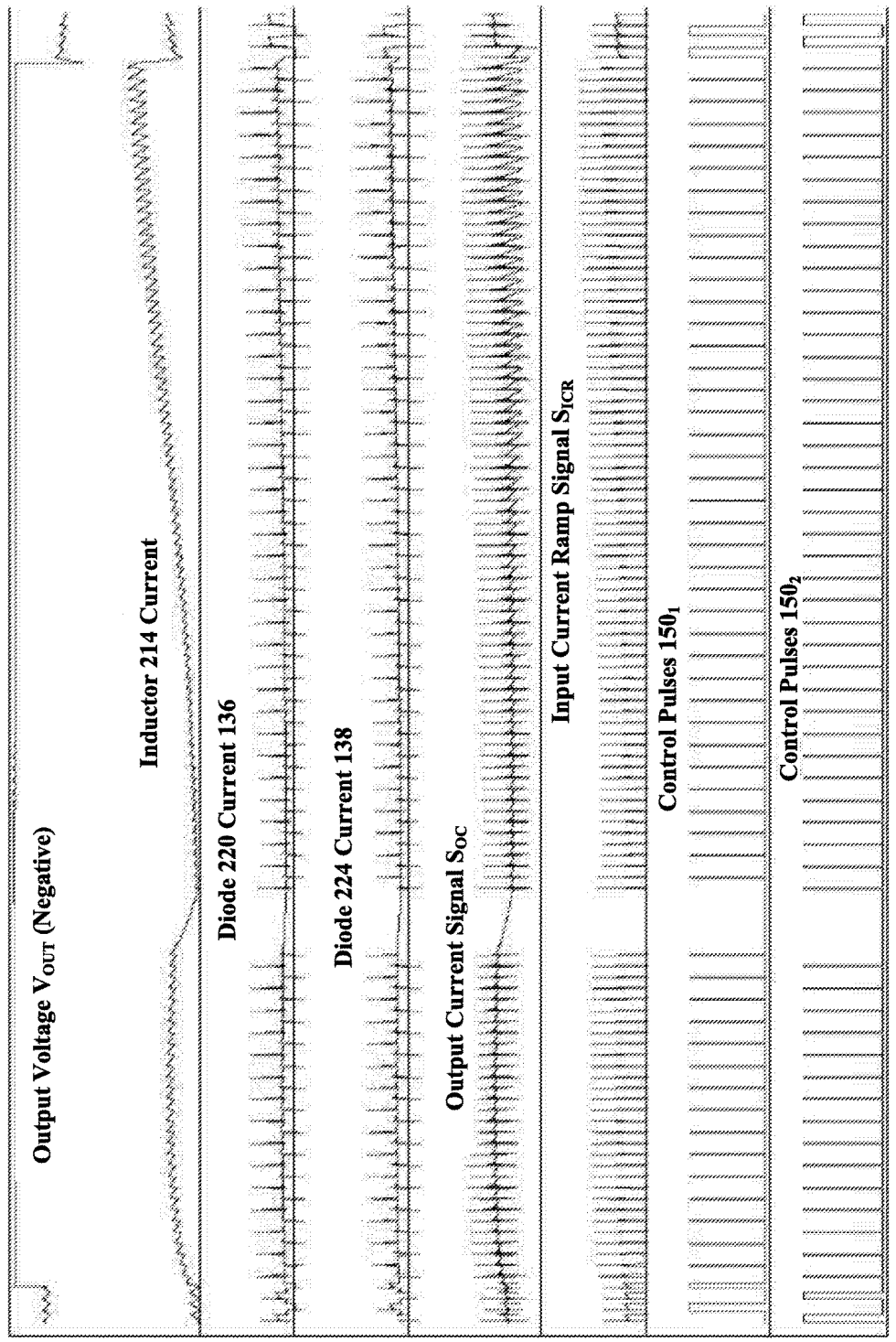
FIG. 3B provides a graph showing exemplary waveforms for the power converter of FIGS. 1-2 with skipping.
Figure 3C:
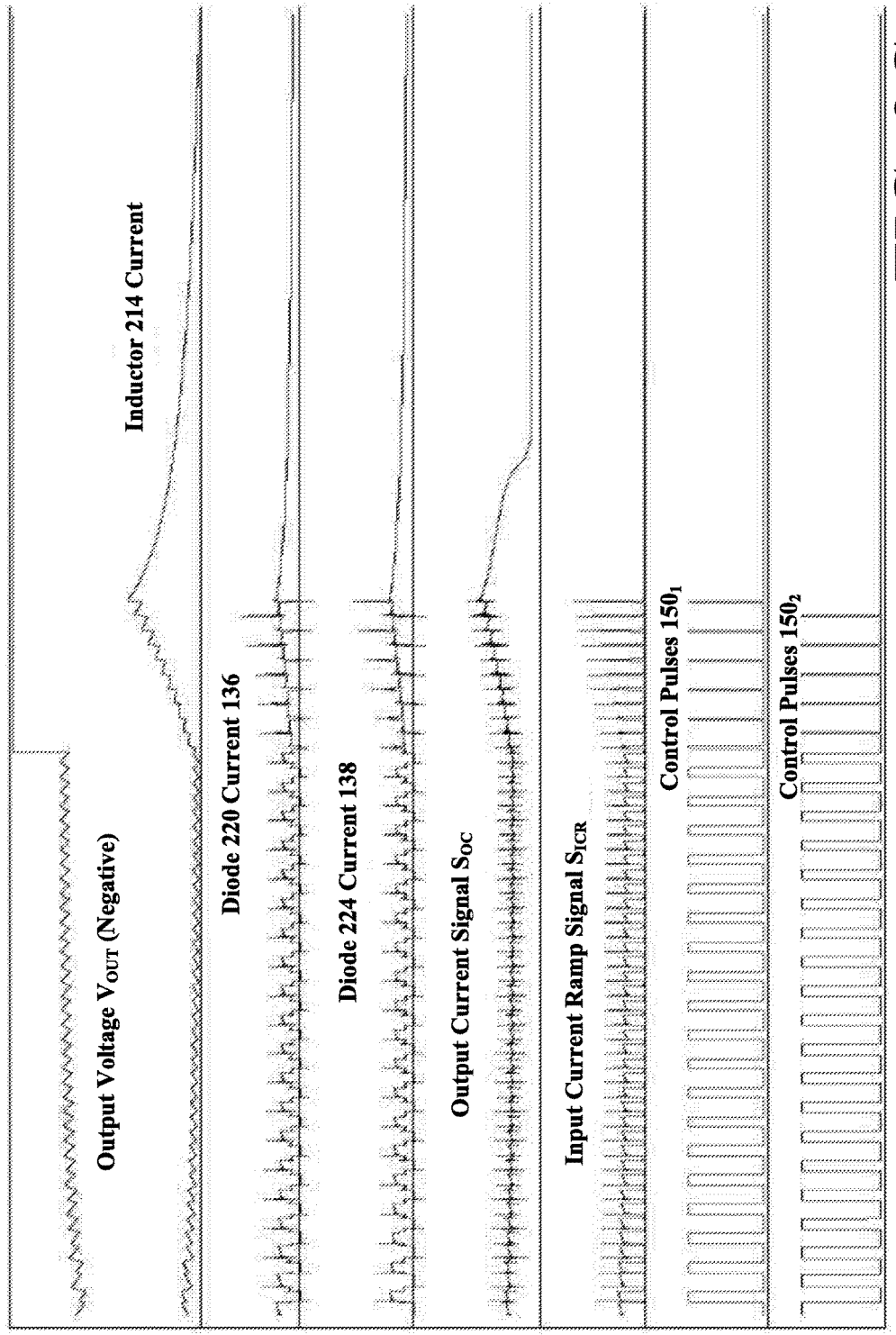
FIG. 3C provides a graph showing exemplary waveforms for the power converter of FIGS. 1-2 with shutdown.

Referring again to FIGS. 1-2, pulses 292, 294 (output from SPC 110) flow to output current sensor 116. Output current sensor 116 comprises current transformers 122, 124 and a sensor 184. Notably, in some scenarios, a single current transformer is provided instead of two (e.g., when the power converter has a single ended output). Each current transformer 122, 124 produces a pulsing current in its secondary winding $122_B$, $124_B$. These currents are referred to herein as induced secondary currents 140, 142. Each induced secondary current 140, 142 is proportional to the current 136, 138 being measured in the respective current transformer's primary winding. Graphs showing exemplary currents 136, 138 are shown in FIGS. 3A-3C. The induced secondary currents 140, 142 are suitable for measuring by sensor 184.

In some scenarios, sensor 184 includes, but is not limited to, diodes 244-252 arranged as shown in FIG. 2. The diodes 244-252 facilitate the detection of the induced secondary currents 140, 142 and the generation of an output current signal $S_{OC}$ proportional to the detected currents. An exemplary output current signal $S_{OC}$ is shown in FIGS. 3A-3C. More specifically, diodes 244, 248 ensure that current flows in direction 299 and not in an opposite direction. Diodes 246, 252 allow the polarity of the voltage across the output current transformers 122, 124 to reverse following the end of the conduction period of the rectifier diodes 220, 224. The magnetizing currents of the current transformers flow through diodes 246, 252 into Zener diode 250 until they are dissipated. This resets the flux in the current transformer cores. Zener diode 250 limits how far negative the voltage will go. Typically the breakdown voltage for Zener diode 250 (e.g., a 68 Volt diode) would be in the range of ten (10) to one hundred (100) Volts. Increasing the breakdown voltage decreases the time required to reset the core of current transformers 122, 124. FIG. 2 shows output current sensor 116 configured to produce positive current 299, but in some scenarios a negative output current 299 may be desirable. In such scenarios, the polarity orientation of diodes 244-250 is reversed from what is shown in FIG. 2.

As shown in FIG. 1, the output current signal $S_{OC}$ is passed to a feedback controller 114. The output current signal $S_{OC}$ comprises a signal which duplicates the sum of the wave shapes of the rectifier currents 292, 294, and is therefore a representation of the output load current scaled down by the primary-secondary turns ratio of the current transformers. An exemplary output current signal $S_{OC}$ is provided in FIGS. 3A-3C.

At the feedback controller 114, the output current signal $S_{OC}$ is processed to generate a current setpoint signal $S_{CSP}$. The feedback controller 114 supplies the current setpoint signal $S_{CSP}$ to a current-mode pulse-width modulator 102 for use in subsequent comparison operations.

Figure 5:
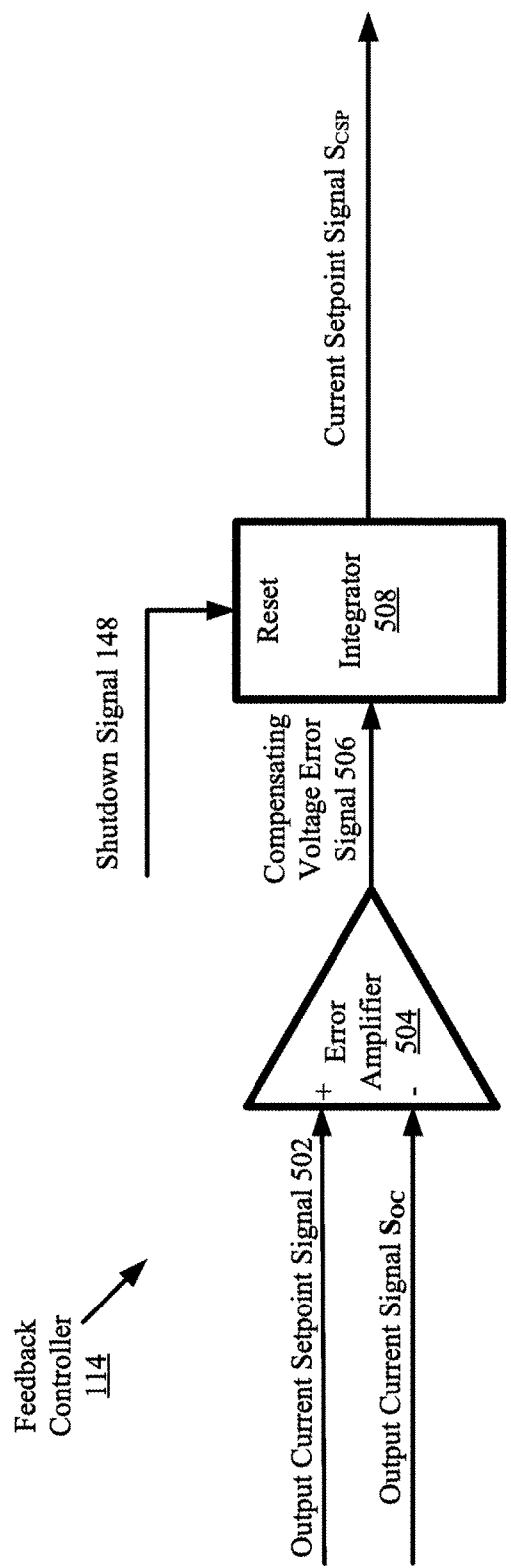
FIG. 5 is a schematic illustration of an exemplary architecture for the feedback controller shown in FIG. 1.

A schematic illustration of an exemplary architecture for the feedback controller 114 is provided in FIG. 5. As shown in FIG. 5, the feedback controller 114 comprises an error amplifier 504 and an integrator 508. FIG. 5 is a functional diagram and feedback controller 114 may comprise analog or digital circuitry. Error amplifiers and integrators are well known in the art, and therefore will not be described in detail herein. Still, it should be understood that at the error amplifier 504 the voltage of the output current signal $S_{OC}$ is compared to a reference voltage of an output current setpoint signal 502 which is set by an external controller (not shown).

The reference voltage is selected in accordance with a particular application. For example, in some scenarios, the SPC 110 is intended to supply a predetermined current level to the load. The load can include, but is not limited to, an arc jet or Hall thruster. An external controller of SPC 100 uses certain criteria to determine what the appropriate current level is at a particular point in time. This criteria is application specific. For example, the criteria can include, but is not limited to, regulating the voltage or power supplied to a load to control thrust.

Any difference between the voltages of the two signals $S_{OC}$, 502 causes an output voltage of the error amplifier 504 to be increased or decreased. If there is no difference between the voltages of the two signals $S_{OC}$, 502, then the error amplifier's output voltage is zero. The output of the error amplifier 504 is referred to as a compensating voltage error signal 506. The compensating voltage error signal 506 flows to the integrator 508.

At the integrator 508, the current setpoint signal $S_{CSP}$ is generated based on the compensating voltage error signal 506. The voltage of current setpoint signal $S_{CSP}$ is approximately a time integral of the voltage of the compensating voltage error signal 506. In some scenarios, feedback controller 114 can be constructed without integrator 508 and simply use proportional control provided by the error amplifier 504. Additionally, in some scenarios, additional compensating circuitry known in the art may be added to feedback controller 114 as necessary to ensure stability for a particular situation.

Referring again to FIG. 1, the current-mode pulse-width modulator 102 is generally configured to (a) determine a starting time of a switching cycle during which control pulses $150_1$, $150_2$ occur and (b) determine the duration of the control pulses $150_1$, $150_2$. In this regard, the current-mode pulse-width modulator 102 comprises a clock 104, a comparator 108 and a skip controller 106. Components 104-108 collectively operate to generate square wave signals that are switched between on and off. The square wave signals include sequences of control pulses $150_1$, $150_2$. Graphs showing exemplary sequences of control pulses are provided in FIGS. 3A-3C and 4A-4B.

The clock 104 is generally provided to coordinate actions of the current-mode pulse-width modulator 102 and the skip counter 112. Accordingly, the clock 104 includes, but is not limited to, a clock generator. Clock generators are well known in the art, and therefore will not be described herein. Any known or to be known clock generator can be used herein without limitation.

In all scenarios, the clock generator generates clock signals 152, 154 which oscillate between a high state and a low state. Graphs showing exemplary clock signals 152, 154 are provided in FIGS. 4A-4C. Notably, in some scenarios such as that shown in FIG. 4A, clock signal 152 does not appear until the output current 136, 138 rises above a minimum output current threshold because at very low output current levels the occurrence of the comparator 108 being high when clock signal 152 is high may not be a reliable indicator that skipping should occur. The clock signals 152, 154 comprise square waves with a fixed constant frequency, but in some scenarios the frequency could be variable. Clock signal 152 is passed to skip controller 106. The skip controller 106 becomes active at the rising edge of the clock signal 152, as shown in FIG. 4B. Clock signal 154 is passed to skip counter 112. The skip counter 112 becomes active at the rising edge of the clocks signal 154 and counts the number of cycles that are skipped when skip signal 190 is asserted.

Figure 4A:
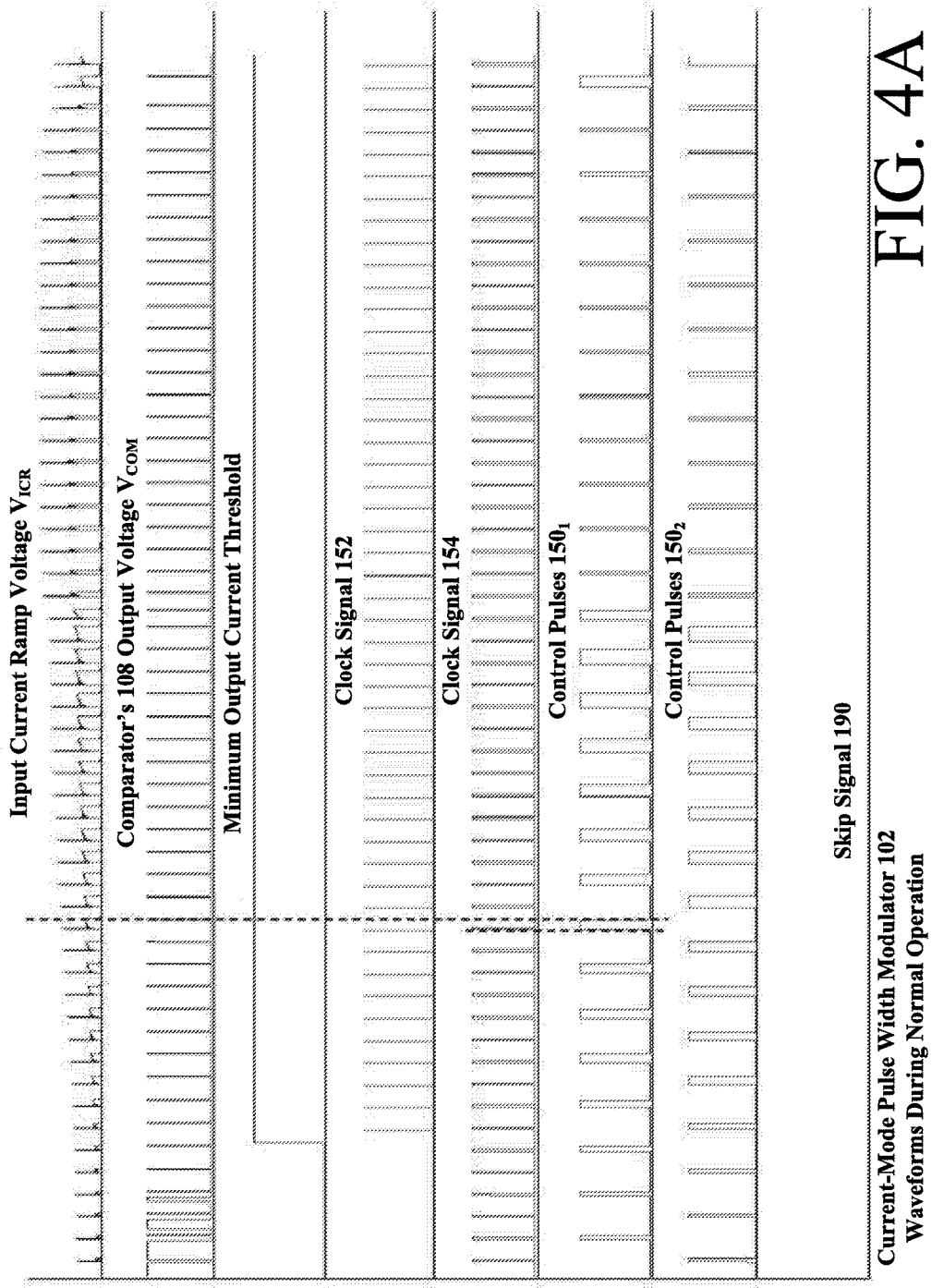
FIG. 4A provides a graph showing exemplary waveforms for the current-mode pulse width modulator of FIG. 1 during normal operations.
Figure 4B:
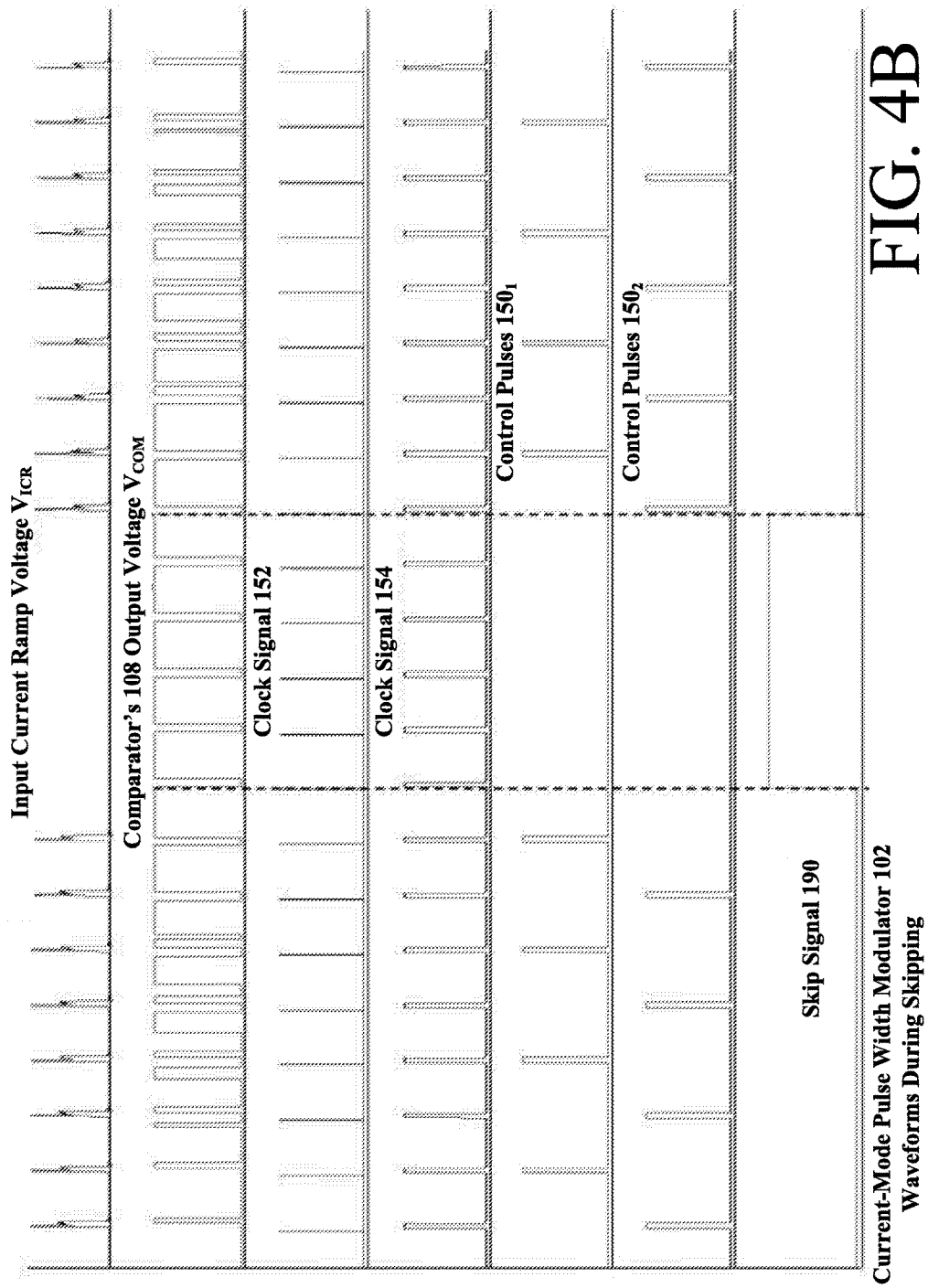
FIG. 4B provides a graph showing exemplary waveforms for the current-mode pulse width modulator of FIG. 1 during skipping.

As also shown in FIG. 4A, a short dashed line is provided to illustrate that the control pulses $150_1$ or $150_2$ start at the leading edge of clock signal 154. A long dashed line is provided to illustrate that the control pulses $150_1$ or $150_2$ end when the comparator's 108 output voltage $V_{COM}$ waveform is "on". The word "on" is used here instead of high because the comparator output voltage $V_{COM}$ could be asserted low or high when the input current ramp voltage waveform exceeds the current setpoint voltage waveform depending on the type of comparator being used or for convenience. The word "off" will be used herein to designate an opposite of "on".

As shown in FIG. 4B, two (2) dashed lines are provided to show that: (a) skipping begins when the comparator's 108 output voltage $V_{COM}$ and clock signal 152 are both asserted; and (b) skipping is stopped when that condition is no longer true.

Notably, the leading edge of the current ramp waveform pulses has a switching noise spike. The width of the clock signal 154 is set so that the comparator's 108 output voltage $V_{COM}$ waveform is suppressed for a time period that ends after the noise spike ends. This is one reason that there is a minimum pulse width or duty cycle for the control pulses. There are many known methods for suppressing the effects of the noise spikes (or "Leading-Edge-Blanking ("LEB")"). Details of this are not provided herein. Particular implementations may rely on something other than the width of clock signal 154 to implement LEB. The duration of the LEB limits the minimum duration of control pulses $150_1$ and $150_2$.

The ratio of the duration of control pulses $150_1$ and $150_2$ compared to the switching period is called the duty cycle. The duration of the LEB sets a minimum duty cycle for SPC 110. In some scenarios, further constraints may be placed on the minimum duty cycle. In some some scenarios such as when the current in inductor 214 does not fall to zero within a switching period, the output voltage of SPC 110 is proportional to the duty cycle. In some scenarios when the load resistance becomes abnormally low, the minimum duty cycle may not be sufficiently small to prevent excessive output current from flowing through output terminals 180, 182. In these scenarios, one or more control pulses $150_1$ and $150_2$ may be skipped to limit the output current to a safe level.

In addition to determining the pulse widths of control pulses $150_1$ and $150_2$, comparator 108 facilitates the skipping of at least one control pulse of a series of control pulses $150_1$ or $150_2$ when a voltage level of an input current ramp signal $S_{ICR}$ exceeds the current setpoint signal $S_{CSP}$ proximate a start time of a next control pulse of the series of control pulses $150_1$ or $150_2$. As such, the comparator 108 comprises an amplifier having an inverting input terminal 155, a non-inverting input terminal 156, and a switched output terminal 158. The current setpoint signal $S_{CSP}$ is supplied to the inverting input terminal 155 from the feedback controller 114. The input current ramp signal $S_{ICR}$ is supplied to the inverting input terminal 156 from the SPC 110.

Under normal operation conditions, non-inverting input terminal 156 is at a lower voltage than inverting input terminal 155 (i.e., $S_{ICR}<S_{CSP}$) at the beginning of each switching cycle, so the $V_{COM}$ signal at output terminal 158 is off. When switch 202 or 204 is turned on by a control pulse at the beginning of a switching cycle, the current in inductor 214 begins to rise and consequently pulsed primary currents 274 and 276 also begin to rise and that causes $S_{ICR}$ to rise with a ramped waveform. When the non-inverting input terminal 156 is at a slightly higher voltage than the inverting input terminal 155 (i.e., $S_{ICR}>S_{CSP}$), the $V_{COM}$ signal at output terminal 158 turns on and whichever switch was conducting turns off until the beginning of the next switching cycle.

Referring now to FIGS. 1 and 5, when the resistance of the load is sufficiently low that the duty cycle cannot be made low enough to keep the output current at the value commanded by output current setpoint signal 502, current setpoint signal $S_{CSP}$ will be reduced from its typical value and in some scenarios may have a reversed polarity. Eventually inverting input terminal 155 will be at a lower voltage than non-inverting input terminal 156 (i.e., $S_{CSP}<S_{ICR}$) proximate to the beginning of a switching cycle when clock 152 is high and skip controller 106 will cause the impending switching cycle to be skipped, which means that control pulses $150_1$, $150_2$ will not be turned on during that switching cycle.

The skip controller 106 generates control pulses $150_1$, $150_2$ having a selected period based on a predetermined switching cycle. The control pulses $150_1$, $150_2$ have at least a minimum duration for controlling the state of at least one switch 202, 204 (e.g., a MOSFET) in the SPC 110 (which has a minimum duty cycle and thus needs pulse skipping to handle short circuits). The control pulses $150_1$, $150_2$ are produced based on a predetermined start time of a switching cycle, a period of the switching cycle, the current setpoint signal $S_{CSP}$, and the input current ramp signal $S_{ICR}$. The manner in which the control pulses are produced based on the listed criteria will become further evident below through the discussion of FIG. 6.

The skip controller 106 causes control pulses $150_1$, $150_2$ to be skipped when the comparator 108 senses that the voltage of the input current ramp signal $S_{ICR}$ exceeds the voltage of the current setpoint signal $S_{CSP}$ just before the starting time of the control pulses $150_1$, $150_2$. The condition of the input current ramp signal's voltage exceeding the current setpoint signal's voltage just before the starting time of a next control pulse occurs when an abnormally low load resistance (such as a short circuit) is connected between the output terminals 180, 182 of the SPC 110. In this condition, the output current cannot be maintained below the setpoint level due to the minimum duration of the control pulses $150_1$, $150_2$.

The skip controller 106 provides the skip signal 190 to the skip counter 112. Graphs showing exemplary skip signals are provided in FIGS. 4A-4C. The skip signal 190 indicates that a switching cycle has been skipped. Pulse skipping allows the output current to be maintained to a safe level.

The magnetic cores of the current transformers 122, 124 may become saturated during a time when many switching cycles are being skipped. This may occur when energy stored in the output inductor 214 forces current through the current transformers 122, 124 during a period of no switching. The magnetic cores of the current transformers 122, 124 are reset each cycle during normal switching. When switching occurs following a sufficiently long skipping event, the output current sensor 116 may provide inaccurate output current signals when the current transformers' 122, 124 magnetic cores are saturated or moving towards saturation. Inaccurate output current signals may prevent the feedback controller from effectively limiting the output current of the SPC 110 to a safe level. Consequently, it is desirable to shut down the SPC when more than a predetermined number of switching cycles have been skipped by counting a certain number of skipped cycles through skip counter 112 which produces a shutdown signal 148 when that certain number of skipped cycles has been reached.

In some scenarios, the skip controller 106 is implemented (e.g., digitally) in a Field Programmable Gate Array ("FPGA"), Application Specific Integrated Circuit ("ASIC"), a General Purpose Processor ("GPP"), or a Programmable Logic Device ("PLD") that is programmed using an algorithm. FPGAs, ASICs, GPPs and PLDs are well known in the art, and therefore will not be described herein. Any known or to be known FPGA, ASIC, GPP and PLD can be employed herein without limitation. For example, the FPGA has a part number RTAX250S-CQ208V and is available from Microsemi Corp having headquarters in Aliso Viejo, Calif. Additionally, any programming language can be used herein for implementing the algorithm. For example, VHSIC Hardware Description Language ("VHDL") is used to program an FPGA in accordance with the flow diagram shown in FIG. 6. The present solution is not limited to the particulars of this example. Clock 104, skip counter 112 and feedback controller 114 may also be implemented within the same FPGA used to implement skip controller 106.

Returning to FIG. 1, the skip counter 112 is provided to cause switching cycles to stop. In this regard, the skip counter 112 generates a shutdown signal 148 and provides the same to current-mode pulse-width modulator 102 and feedback controller 114. A graph showing an exemplary shutdown signal is provided in FIG. 4C. The shutdown signal 148 may cause a control loop to be reset. The shutdown signal 148 is provided (a) after a predetermined number of switching cycles has been skipped or (b) if a predetermined time interval has elapsed with more than a predetermined number of switching cycles having been skipped. The skip counter 112 is reset if the skip signal 190 is removed before the shutdown signal 148 has occurred. The shutdown signal 148 is latched until the skip counter 112 has been reset (a) after a predetermined time interval following a decay in the energy stored in the output inductor 214 of the SPC 110 or (b) by an external signal.

Figure 6:
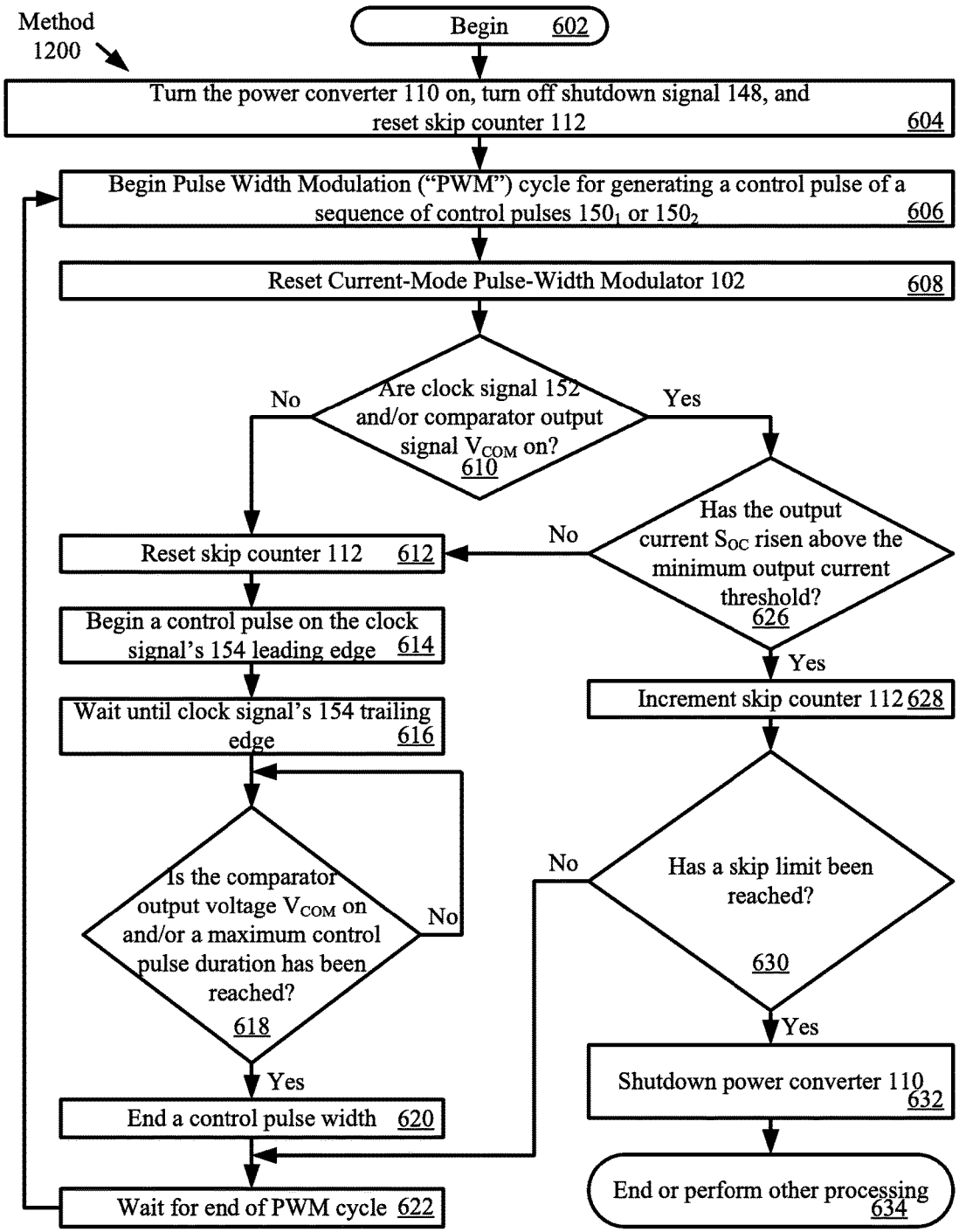
FIG. 6 is a flow diagram of an exemplary method that is useful for understanding operations of the skip controller shown in FIG. 1.

Referring now to FIG. 6, a flow diagram of a method 600 implemented by skip controller 106 is provided. As shown in FIG. 6, method 600 begins with step 602 and continues with step 604 where the SPC 110 is turned on, a shutdown signal 148 is turned off (e.g., set low or high), and a skip counter 112 is reset. In a next step 606, a Pulse Width Modulation ("PWM") cycle is begun for generating a control pulse of a sequence of control pulses $150_1$ or $150_2$. The PWM cycle is also referred to herein as a switching cycle. The duration of a PWM cycle begins on a leading edge of a pulse of clock signal 152 and the current-mode pulse-width modulator 102 is reset thereafter in step 608.

Upon completing step 608, steps 610-632 are performed to either generate a control pulse or skip the PWM cycle (or stated differently skip the control pulse's generation). In this regard, it should be noted that the control pulse is generated based on a predetermined start time of the PWM cycle, a period of the PWM cycle, the current setpoint signal $S_{CSP}$, and the input current ramp signal $S_{ICR}$. This will become more evident as the discussion progresses. Still, it should be understood that the current setpoint signal $S_{CSP}$ and the input current ramp signal $S_{ICR}$ are taken into account using comparator 108. As such, the output voltage $V_{COM}$ of comparator 108 is used by the skip controller 106 in method 600 for the above stated purpose.

As shown in FIG. 6, decision step 610 is performed to determine if the clock signal 152 and/or the comparator's 108 output signal $V_{COM}$ are on or active (e.g., set high or low). For example, as shown in FIG. 4B, if one of these signals is not asserted (e.g., low) [610:NO], then the PWM cycle is performed in which a control pulse $150_1$ or $150_2$ is generated in steps 612-622. In contrast, if both of these signals are asserted (e.g., high) [610:YES], then the skip controller 106 performs skip operations in steps 626-632. The present solution is not limited to the particulars of this example. Alternatively, the signals can be considered on or active when set low instead of set high.

Referring again to FIG. 6, the method 600 continues with steps 612-622 when a determination is made that one of the signals 152, $V_{COM}$ is not on or asserted [610:NO]. Steps 612-622 involve; resetting the skip counter 112; beginning a control pulse on the clock signal's 154 leading edge; waiting until the clock signal's 154 trailing edge; and ending the control pulse width when the comparator's 108 output voltage $V_{COM}$ is on and/or a maximum control pulse duration has been reached as shown in decision step 618. At the end of the PWM cycle, method 600 returns to step 606 where a next PWM cycle begins.

Before a PWM cycle is skipped, one more qualifier must be met. Notably in some scenarios, this qualifier might not be necessary. This qualifier is associated with the output current $S_{OC}$. As shown by decision step 626 of FIG. 6, a determination is made as to whether the output current $S_{OC}$ has risen above the minimum output current threshold. If the output current $S_{OC}$ has not risen above the minimum output current threshold [626:NO], then method 600 continues with steps 612-622 in which the control pulse is generated. These steps 612-622 are discussed above.

In contrast, if the output current 136, 138 has risen above the minimum output current threshold [626:YES], step 628 is performed where the skip counter 112 is incremented. Next in step 630, a decision is made as to whether a skip limit has been reached. The term "skip limit", as used herein, refers to the maximum number of PWM cycles that should be skipped after a skip signal 190 is set high (or alternatively set low). For example, as shown in FIG. 4B, the skip signal 190 is set high at time t indicated by a first dashed line (i.e., the left most vertical dashed line). Thereafter, no control pulses $150_1$ and $150_2$ are generated in the next N PWM cycles, where N is an integer (e.g., any integer less than a predetermined number designated as the skip limit such as twelve). After the end of the Nth PWM cycle, the skip signal 190 is set low (or alternatively set high) as shown by the second dashed line (i.e., the right most dashed line). Subsequently, the control pulses $150_1$ and $150_2$ may be generated once again. Therefore, as shown in FIG. 6, method 600 continues with step 622 in some scenarios where the skip limit (e.g., 12 PWM cycles) has not been reached and the inductor 214 is not heading towards inaccurate operation (i.e., the inductor's 214 current has discharged so as to return to zero or a flux in the inductor's magnetic core is not moving towards saturation) [630:NO].

In other cases such as that shown in FIG. 4C, the control pulses $150_1$ and $150_2$ are not generated when the skip limit is reached because the output current transformers 122 and 124 are heading towards inaccurate operation (i.e., the inductor's 214 current has not discharged enough so as to return to zero such that flux in the magnetic cores of the output current transformers 122 and 124 are moving towards saturation) [630:YES]. Note that the circuit doesn't actually know if saturation is about to occur, it just shuts down when the skip limit has been reached. The circuit designer sets the number of allowed skip cycles based on an analysis of when saturation could occur. Accordingly, method 600 continues with step 632 where the SPC 110 is shutdown to prevent damage or further damage to SPC 100. Subsequently, step 634 is performed where method 600 ends or other processing is performed.

Figure 7:
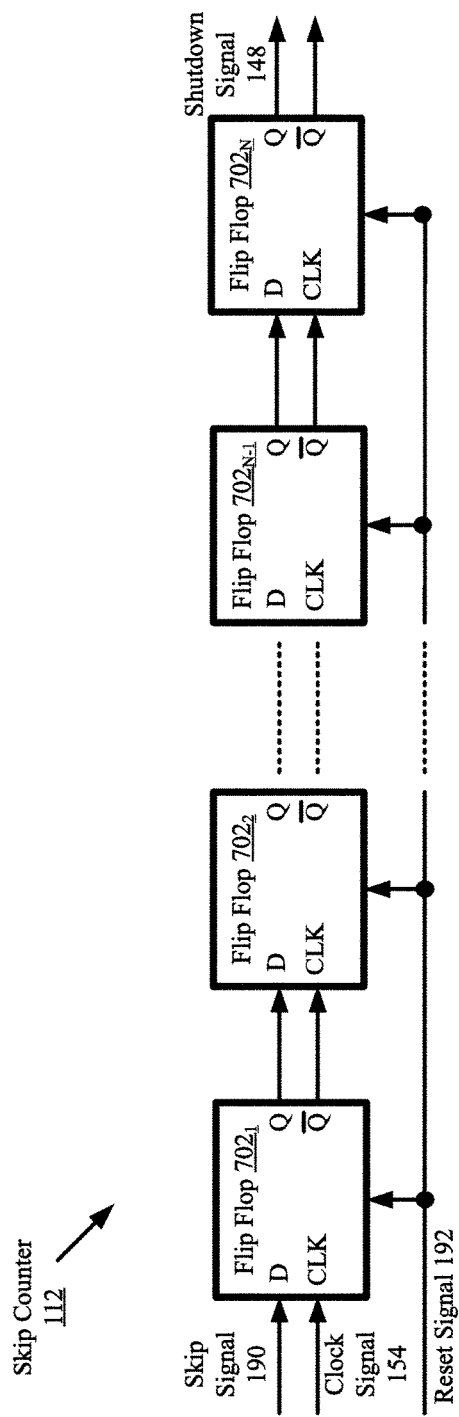
FIG. 7 provides a schematic illustration of an exemplary architecture for the skip counter shown in FIG. 1.

A schematic illustration of an exemplary architecture for the skip counter 112 is provided in FIG. 7. As shown in FIG. 7, the skip counter 112 comprises a plurality of flip flops $702_1, 704_2, \ldots, 702_{N-1}, 702_N$ arranged in series. In some scenarios, the total number of flip flops is selected based on the skip limit value (e.g., 12). For example, if the skip limit value is twelve (12), then twelve (12) flip flops are provided. The inputs to the first flip flop $702_1$ are the skip signal 190 and the clock signal 154. The outputs of the first flip flop $702_1$ are passed to the inputs of the second first flip flop $702_2$, and so on. All of the flip flops $702_1, 704_2, \ldots, 702_{N-1}, 702_N$ are connected so as to receive the reset signal 192. The present solution is not limited to the skip counter architecture shown in FIG. 7.

We claim:

1. A system for providing short-circuit protection for a Switching Power Converter ("SPC"), comprising:
   an input current sensor electrically connected to detect an input current of the SPC and configured to generate an input current ramp signal $S_{ICR}$ representing the detected input current;
   an output current sensor electrically connected to detect an output current of the SPC by sensing a pulsing current flowing through an output rectifier of the SPC using at least one current transformer, and configured to generate an output current signal $S_{OC}$ representing the detected output current;
   a feedback controller electrically connected to the output current sensor and comprising an integrator configured to generate a current setpoint signal $S_{CSP}$ having a voltage which is based on an error signal received from an error amplifier, the error signal derived from a detected difference between the output current signal $S_{OC}$ and a reference signal; and
   a current-mode pulse-width modulator electrically connected to the feedback controller and configured to
      generate a series of control pulses to be supplied to the SPC for selectively transitioning at least one switch of the SPC between an on state and an off state, each pulse of the control pulses beginning at a predetermined start time of a switching cycle and ending when either the input current ramp signal $S_{ICR}$ exceeds the current setpoint signal $S_{CSP}$ or the pulse's duration reaches a predetermined maximum value,
      skip generation of at least one control pulse of the series of control pulses when results of comparator operations indicate that a first voltage level of the input current ramp signal $S_{ICR}$ exceeds a second voltage level of the current setpoint signal $S_{CSP}$ proximate a start time of the next control pulse of the series of control pulses, the first voltage level exceeding the second voltage level when an abnormally low load resistance is connected between output terminals of the SPC during operation of the SPC, and
      stop operations of the SPC if more than a predetermined number of consecutive switching cycles are skipped;
   wherein the current-mode pulse-width modulator comprises a skip controller programmed to cause generation of a control pulse of the series of control pulses when a clock signal and an output signal of a comparator are not asserted.

2. The system according to claim 1, wherein, during normal operation of the SPC, the input current ramp signal $S_{ICR}$ is less than the current setpoint signal $S_{CSP}$ at the beginning of each switching cycle.

3. The system according to claim 1, wherein pulse skipping is allowed only when the output current signal $S_{OC}$ exceeds a predetermined threshold.

4. The system according to claim 1, wherein pulse skipping is blocked when the output current of the SPC is less than a predetermined threshold.

5. The system according to claim 1, wherein a signal for inhibiting control pulse skipping is generated when an output current of the SPC is less than a minimum output current threshold.

6. The system according to claim 1, wherein the clock signal being asserted when the output current of the SPC rises above a minimum output current threshold and the comparator being asserted based on results of a comparison of the first voltage level of the input current ramp signal $S_{ICR}$ and the second voltage level of the current setpoint signal $S_{CSP}$.

7. The system according to claim 1, wherein the current-mode pulse-width modulator comprises a skip controller programmed to cause generation of a control pulse of the series of control pulses when (a) at least one of a clock signal and an output signal of a comparator is asserted and (b) an output current of the SPC has not risen above a minimum output current threshold during normal operation.

8. The system according to claim 1, wherein the current-mode pulse-width modulator comprises a skip controller programmed to cause a skip of a control pulse generation when (a) at least one of a clock signal and an output signal of a comparator is asserted and (b) an output current of the SPC has risen above a minimum output current threshold.

9. A circuit for providing protection from short circuits, comprising:
a current-mode pulse-width modulator
receiving an input current ramp signal $S_{ICR}$ from a power converter to which the current-mode pulse-width modulator is connected,
receiving a current setpoint signal $S_{CSP}$ from a feedback controller, wherein the feedback controller is connected to an output current sensor and the current-mode pulse-width modulator, and the output current sensor is connected to the power converter, and
providing a series of control pulses to the power converter, the control pulses based on a predetermined start time of a switching cycle, a period of the switching cycle, the input ramp signal, and the setpoint signal; and
a skip controller of the current-mode pulse-width modulator causing one of the series of control pulses to be skipped when results of comparator operations indicate that the input current ramp signal exceeds the current set point signal proximate a start time of the next one of the series of control pulses, and causing generation of a control pulse of the series of control pulses when a clock signal and an output signal of a comparator are not asserted.

10. The circuit according to claim 9, further comprising:
a counter providing a shutdown signal to the feedback controller in response to a predetermined number of control pulses being skipped;
wherein the counter is connected to the feedback controller and the current-mode pulse-width modulator.

11. A method, comprising:
detecting an input current of a Switching Power Converter ("SPC");
generating an input current ramp signal $S_{ICR}$ representing the detected input current;
detecting an output current of the SPC by sensing a pulsing current flowing through an output rectifier of the SPC using at least one current transformer;
generating an output current signal $S_{OC}$ representing the detected output current;
generating a current setpoint signal $S_{CSP}$ having a voltage which is based on an error signal derived from a detected difference between the output current signal $S_{OC}$ and a reference signal;
generating a series of control pulses to be supplied to the SPC for selectively transitioning at least one switch of the SPC between an on state and an off state, each pulse of the control pulses beginning at a predetermined start time of a switching cycle and ending when either the input current ramp signal $S_{ICR}$ exceeds the current setpoint signal $S_{CSP}$ or the pulse's duration reaches a predetermined maximum value;
skipping generation of at least one control pulse of the series of control pulses when results of comparator operations indicate that a first voltage level of the input current ramp signal $S_{ICR}$ exceeds a second voltage level of the current setpoint signal $S_{CSP}$ proximate a start time of the next control pulse of the series of control pulses, the first voltage level exceeding the second voltage level when an abnormally low load resistance is connected between output terminals of the SPC during operation of the SPC; and
stopping operations of the SPC if more than a predetermined number of consecutive switching cycles are skipped;
wherein a control pulse of the series of control pulses is generated when a clock signal and an output signal of a comparator are not asserted.

12. The method according to claim 11, wherein, during normal operation of the SPC, the input current ramp signal $S_{ICR}$ is less than the current setpoint signal $S_{CSP}$ at the beginning of each switching cycle.

13. The method according to claim 11, wherein said skipping is allowed only when the output current signal $S_{OC}$ exceeds a predetermined threshold.

14. The method according to claim 11, wherein said skipping is blocked when the output current of the SPC is less than a predetermined threshold.

15. The method according to claim 11, further comprising generating a signal for inhibiting control pulse skipping when an output current of the SPC is less than a minimum output current threshold.

16. The method according to claim 11, wherein the clock signal being asserted when the output current of the SPC rises above a minimum output current threshold and the comparator being asserted based on results of a comparison of the first voltage level of the input current ramp signal $S_{ICR}$ and the second voltage level of the current setpoint signal $S_{CSP}$.

17. The method according to claim 11, wherein a control pulse of the series of control pulses is generated when (a) at least one of a clock signal and an output signal of a comparator is asserted and (b) an output current of the SPC has not risen above a minimum output current threshold during normal operation.

18. The method according to claim 11, wherein a control pulse generation is skipped when (a) at least one of a clock signal and an output signal of a comparator is asserted and (b) an output current of the SPC has risen above a minimum output current threshold.

19. The system according to claim 1, wherein the voltage of the current setpoint signal $S_{CSP}$ is based on a time integral of a voltage of the error signal.

* * * * *